[26.]
ELIAS GROAT.
No. 118,712.
Improved Churn.
Patented Sep. 5, 1871.
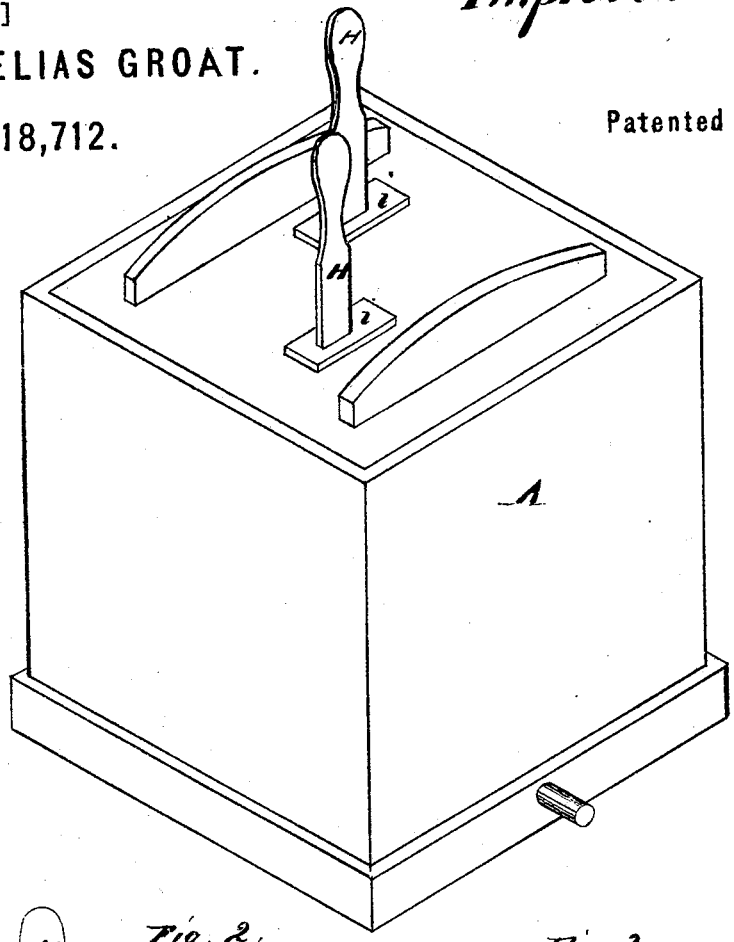
Fig. 2.
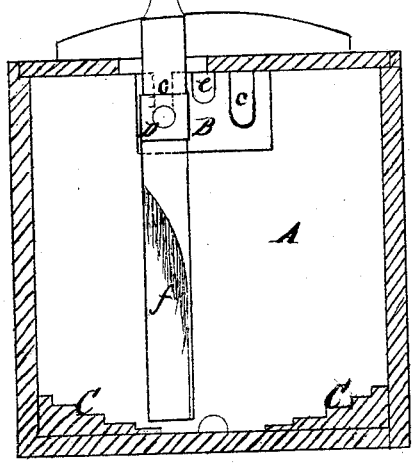
Fig. 3.
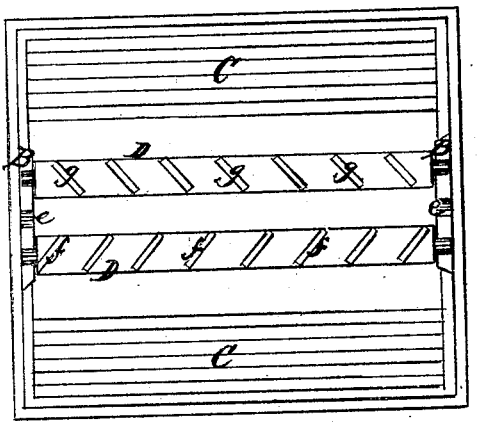
Witnesses.
Brock Johnson
Wm B Isaacs
Inventor.
Elias Groat
By his Atty C W M Smith

UNITED STATES PATENT OFFICE.

ELIAS GROAT, OF NAPA, CALIFORNIA.

IMPROVEMENT IN CHURNS.

Specification forming part of Letters Patent No. 118,712, dated September 5, 1871.

*To all whom it may concern:*

Be it known that I, ELIAS GROAT, of San Francisco, in the county of San Francisco and State of California, have invented an Improvement in Churns and Butter-Workers Combined; and I do hereby declare that the following is a full and exact description of the same, reference being had to the accompanying drawing and to the letters of reference marked thereon.

My invention relates to an improvement in the construction and operation of churns for butter-making; and it consists mainly in a novel application of two parallel vibrating shafts which cross the churn and are each provided with a series of peculiarly-shaped arms which beat the cream by the opposite motion imparted to them, and after the butter is formed they may be employed to gather and work it by giving them motion in the same direction.

In the drawing, Figure 1 is a perspective view. Fig. 2 is a transverse section. Fig. 3 is a plan.

To enable others skilled in the art to which my invention appertains to make and use the same, I will now proceed to describe fully its construction and the manner of operation.

A is a box, suitably formed to contain the cream. This box is made as shown, and of a transverse section, equal to or having a containing capacity for an ordinary quantity of cream. If the quantity is to be larger the churns are simply made longer, but the cross-section remains the same in all. The bottom of the churn-box is curved upward at the sides, forming a series of steps, C, for the purpose of more thoroughly separating the particles of cream while being operated upon by the dashers. At the two opposite ends are fitted boxes B, having sockets $c$ for the gudgeons of two shafts, D D', which extend across the churn. Between the sockets $c$ is another socket, $e$, the use of which will be presently explained. The shafts D D' are provided with downwardly-projecting arms or dashers $f$ and $g$, respectively, the dashers $f$ being so set or formed as to stand at an angle of about forty-five degrees with their shaft. The dashers $g$ are also set at a similar angle on their shaft, but are so arranged as to stand at or nearly at right angles with the dashers $f$. The dashers may be operated by suitable machinery connected with their shafts, or by the handles H which pass up through the cover through guards or protectors $i$.

The operation will be as follows: Cream being placed in the churn, the dashers are set in motion in contrary directions, one set passing between the other set as they meet, and thus thoroughly breaking up the body of the cream, so that its particles will be acted on to make the necessary change. The butter is thus quickly formed and the two sets of dashers may then be made to move in the same direction, which will gather the butter together; and it can be also worked in this manner, or one of the dashers can be altogether removed and the other placed in the socket $e$ and thus be employed singly.

It will here be observed that when the dashers are in operation the cream will not be thrown out against the sides of the churn or slop over, as the peculiar construction and action of the paddles is such as to prevent this result; also, by this construction the churn can be easily kept in a clean and sweet condition.

Having thus described my invention, what I claim, and desire to secure by Letters Patent, is—

The parallel shafts D D', with their peculiarly-arranged dashers $f$ and $g$, when constructed to operate substantially as herein described.

In witness whereof I have hereunto set my hand and seal.

ELIAS GROAT. [L. S.]

Witnesses:
  C. W. M. SMITH,
  M. B. POND.